(12) United States Patent
Ichikawa et al.

(10) Patent No.: US 7,300,184 B2
(45) Date of Patent: Nov. 27, 2007

(54) PLANAR LIGHT SOURCE DEVICE AND DISPLAY DEVICE USING THE SAME

(75) Inventors: Koji Ichikawa, Kumamoto (JP); Seiji Sakai, Tokyo (JP); Toshiyuki Yoneda, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 247 days.

(21) Appl. No.: 11/130,255

(22) Filed: May 17, 2005

(65) Prior Publication Data

US 2005/0270796 A1   Dec. 8, 2005

(30) Foreign Application Priority Data

Jun. 7, 2004   (JP)   ............... P2004-168866

(51) Int. Cl.
*F21V 5/00*   (2006.01)

(52) U.S. Cl. .............. 362/331; 362/326; 362/332; 362/551; 362/555; 362/561; 362/613; 362/620

(58) Field of Classification Search .............. 362/326, 362/331, 332, 551, 555, 561, 613, 620
See application file for complete search history.

(56) References Cited

U.S. PATENT DOCUMENTS

2004/0130884 A1* 7/2004 Yoo et al. ............... 362/31

FOREIGN PATENT DOCUMENTS

| JP | 2000-310776 | 11/2000 |
|----|-------------|---------|
| JP | 2004-039482 | 2/2004  |

* cited by examiner

*Primary Examiner*—Sandra O'Shea
*Assistant Examiner*—Meghan K. Dunwiddie
(74) *Attorney, Agent, or Firm*—Buchanan Ingersoll & Rooney

(57) ABSTRACT

In a planar light guiding device and a display device, plural light guiding rods are arranged in parallel to one another in a housing having an opening portion serving as a light emission face at the upper surface thereof, and a point light source (LED) 2 is disposed so as to oppose to at least one of both the end faces 1a of each light guiding rod through a space, thereby constituting a light source unit. These light source units are arranged in the metal housing to thereby form the planar light guiding device.

15 Claims, 10 Drawing Sheets

(a)

(b)

(a)

(b)

PRIOR ART

PLANAR LIGHT SOURCE DEVICE AND DISPLAY DEVICE USING THE SAME

BACKGROUND OF THE INVENTION

1. Field of the Invention

The present invention relates to a planar light source device and a display device using the planar light source device.

2. Description of the Related Art

There are known two types of planar light source devices each of which is disposed at the back surface side of a liquid crystal display device. One type of these planar light source devices is called an edge light type, and the other type thereof is called a just-below type. According to the edge light type planar light source device, a light source is disposed at one side surface or at both side surfaces of a light guiding plate of the light source, and lights from the light sources are emitted from the end surfaces of the light guiding plate so that the light is emitted in a planar shape.

The edge light type planar light source device has such a feature that the thickness of the planar light source device can be reduced, however, it needs the light guiding plate having the same size as or larger than the display area as the light guiding plate and thus the weight of the planar light source device is increased.

On the other hand, according to the just-below type planar light source device, plural linear light sources (fluorescent tubes) are arranged just below the light emission face opposing a liquid crystal panel, and the just-blow type planar light source device needs no light guiding plate, so that the weight thereof is small. However, when the distance from the light source to the light emission face is small, unevenness in brightness (in general, light is bright just above a linear light source whereas light is dark between linear light sources) is easily visually identified, and thus it is necessary to increase the distance from the light source to the light emission face. Furthermore, when the distance between each light source and a metal housing disposed at the reflection face side so as to confront the light emission face is small, leak current occurs between the metal housing and each light source, so that the linear light sources are not normally turned on. Therefore, this type of planar light source device has such a feature that it is necessary to increase the distance between the metal housing and each light source, and the thickness of the planar light source device (in general, 3 mm or more) is increased.

Recently, the liquid crystal display device has been broadly used for not only a personal computer, but also a television set, and rapidly increased in size. In general, the former just-below type planar light source which provides high brightness and is light in weight has prevailed as a planar light source device used for a large-size liquid crystal display device. Therefore, it has been required to overcome the drawbacks in thickness, unevenness of brightness, etc. as quickly as possible with keeping the high brightness and the light weight which are advantages of the just-below type planar light source device. An illumination device in which an auxiliary light source (point light source) is provided just below a main light source (fluorescent tube) as disclosed in JP-A-2000-310776 (pp 3-4, FIG. 1) has been proposed as a means for overcoming the unevenness of brightness of the just-below type planar light source device. Furthermore, JP-A-2004-39482 has proposed a planar light source device in which rod-like light emitters each comprising a rod body and an LED are juxtaposed with one another.

According to the illumination device proposed in JP-A-2000-310776, it is possible to reduce the distance from the main light source (fluorescent tube) to the light emission face, however, it is impossible to reduce the distance between the main light source and the metal housing at the reflection face side. Furthermore, the auxiliary light source is equipped with a light guiding plate in addition to the main light source. Therefore, this device has a drawback that the construction is complicated and the thickness of the light guiding plate is increased. In addition, the fluorescent tube serving as the main light source contains mercury which is an environmental load material although the amount of mercury is minute, and thus it has been required to develop a planar light source device using a light source which takes the place of the fluorescent tube.

According to the planar light source device disclosed in JP-A-2004-39482, the LEDs are designed so that the illumination intensity of each LED is individually adjustable. Therefore, it is possible to adjust unevenness in brightness caused by dispersion of the LEDs, however, it is impossible to improve such unevenness in brightness along the longitudinal direction of the rod bodies that the brightness is higher in the neighborhood of each LED, but the brightness is lower as the position is far away from each LED. Particularly, since the LEDs are brought into close contact with the rod bodies, this type of planar light source device has a problem that light which travels in each rod body by total reflection and is a part of light emitted from each LED is reduced, and thus the amount of light emitted around each LED is increased.

SUMMARY OF THE INVENTION

The present invention has been implemented in view of the foregoing description, and has an object to provide a planar light source device which is designed to have a thin and light construction and has no unevenness in brightness without using conventional linear light sources (fluorescent tubes), and a display device using the planar light source device.

In order to attain the above object, a planar light source device according to the first aspect of the present invention includes a housing, a plurality of light source units, a reflection plate. The housing has an opening portion in an upper surface thereof. Each of the light source units includes a light guiding rod arranged in the housing and at least one point light source disposed so as to oppose to at least one end faces of the light guiding rod and emit light to the one end face. The reflection plate which is disposed below the plurality of light source units in the housing and reflects light emitted from the light source units to the opening portion. In the planar light source device, each of the light guiding rods has a light emission means for varying a light emission rate in accordance with the distance from each point light source.

Furthermore, a planar light source according to the second aspect of the present invention includes a housing, a plurality of light source units, a reflection plate. The housing has an opening portion in an upper surface thereof. Each of the light source units includes a light guiding rod arranged in the housing and at least one point light source disposed so as to oppose to at least one end face of the light guiding rod and emit light to the one end face. The reflection plate which is disposed below the plurality of light source units in the housing and reflects light emitted from the light source units to the opening portion. In the planar light source device, each of the light guiding rods is designed so that the sectional area thereof in the vertical direction to the longitudinal direction thereof is varied.

Furthermore, a display device according to the present invention includes the above planar light source device and a display unit which is disposed above the opening portion of the planar light source device and modulates light emitted from the planar light source device to display information.

According to the present invention, each of light source units includes the light guiding rod and at least one point light source. The light source units are used in place of the conventional linear light sources (fluorescent tubes), and thus the planar light source device of the present invention contains no mercury acting as environmental load material. Furthermore, no leak current occurs between each light guiding rod and the housing, and thus the distance between each light guiding rod and the housing can be reduced. Still furthermore, the light guiding rods of the light source units can be designed to be smaller in volume and lighter in weight as compared with the light guiding plates used in the conventional edge light type planar light source device. In addition, each light guiding rod is provided with the light emission means for varying the light emission rate in accordance with the distance from the point light source or each light guiding rods is designed so that the sectional area thereof in the vertical direction to the longitudinal direction thereof is varied. Therefore, light from the point light sources arranged discretely is emitted while expanded, so that unevenness in brightness and unevenness in color (color heterogeneity) due to dispersion of the point light sources can be reduced, and further the unevenness in color can be reduced when plural point light sources different in emission light color are used. Accordingly, a thin and light type planar light source having high display quality and a liquid crystal display device can be achieved without containing any environmental load material.

DETAILED DESCRIPTION OF THE PREFERRED EMBODIMENTS

Preferred embodiments (first to fourth embodiments) of the present invention will be described hereunder with reference to the accompanying drawings. First, the structure of a liquid crystal display device using a planar light source device according to each embodiment will be briefly described. The liquid crystal display device includes a transmission type liquid crystal panel which is equipped above the light emission face of the planar light source device and displays images by utilizing the birefringence of liquid crystal. The liquid crystal panel has a TFT array substrate and a color filter substrate, and also has a liquid crystal layer sandwiched between these two substrates.

The TFT array substrate has thin film transistors serving as switching elements, pixel electrodes, etc., and a driving voltage is applied to each pixel electrode by the connecting operation of the corresponding switching element. The liquid crystal molecules of the liquid crystal layer are orientated by the driving voltage, and a desired image is displayed. The color filter substrate has colored layers of red, green and blue, a light shielding layer (black matrix), etc. The liquid crystal panel and the planar light source device are fixed by the housing, thereby constructing the liquid crystal display device.

First Embodiment

Figure 1:
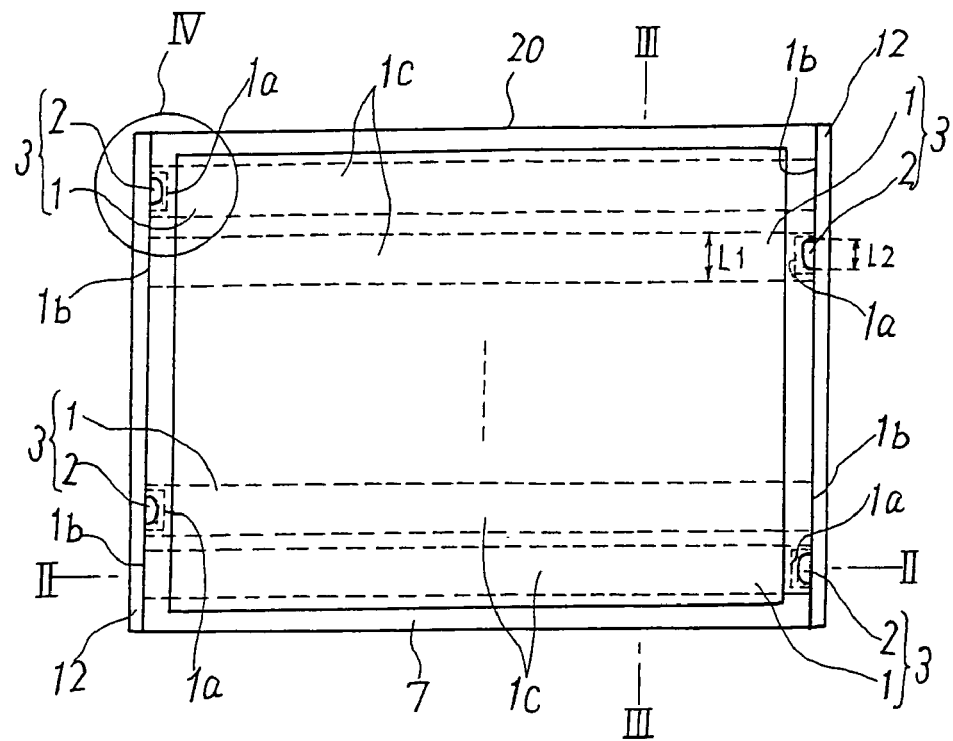
FIG. 1 is a plan view showing a planar light source device according to a first embodiment of the present invention.
Figure 2:
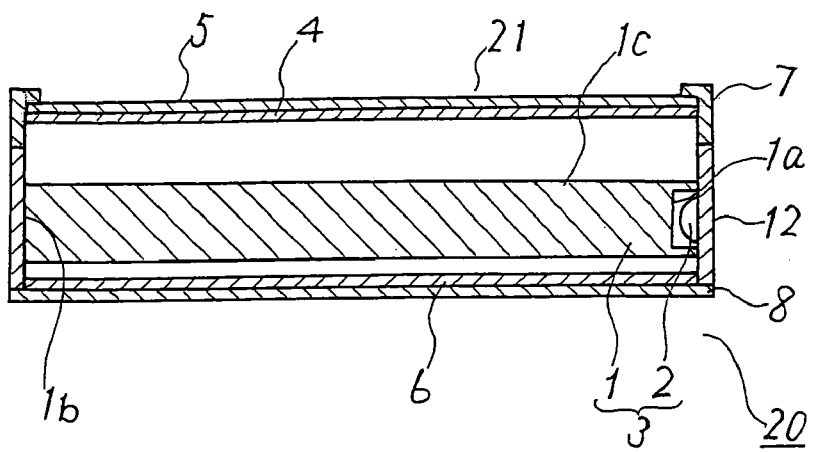
FIG. 2 is a horizontally sectional view showing the planar light source device according to the first embodiment of the present invention.
Figure 3:
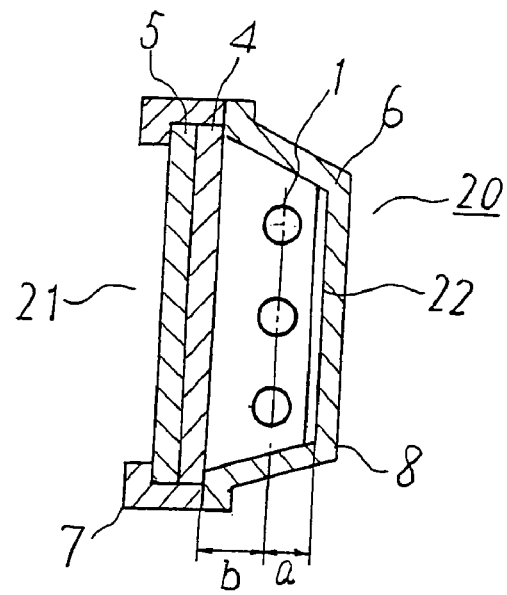
FIG. 3 is a vertically sectional view showing the planar light source device according to the first embodiment of the presents invention.

FIG. 1 is a plan view showing a planar light source device according to a first embodiment, FIG. 2 is a horizontally sectional view showing the cross-section of a part indicated by II-II of FIG. 1, and FIG. 3 is a vertically sectional view showing the cross-section of a part indicated by III-III of FIG. 1. In these figures, the same or corresponding parts are represented by the same reference numerals.

The planar light source device 20 of the first embodiment includes a metal housing which includes a first frame 7 having an opening portion serving as a light emission face 21 on the upper surface thereof and a second frame 8 surrounding the lower portion of the metal housing, and plural light guiding rods 1 which are formed of acrylic resin, polycarbonate resin or the like, or a transparent material such as glass or the like and arranged in parallel to one another in the metal housing. Relating to each light guiding rod 1, a point light source 2 is disposed so as to oppose an end face 1a of each light guiding rod 1 through space. The planar light source device 20 of the first embodiment is provided with a plurality of light source units 3 and each of light source units 3 includes the light guiding rod 1 and the point light source 2 opposing to one end face 1a of each light guiding rod 1 as a new light source which is replaced for the linear light sources (fluorescent tubes) of the conventional just-below type light source device. The light guiding rods 1 may suffer from deformation such as expansion, contraction, warp or the like due to changes in temperature and humidity and thus it is preferable that the respective light source units 3 are disposed so that a space is formed between the adjacent light source units 3.

Figure 4:
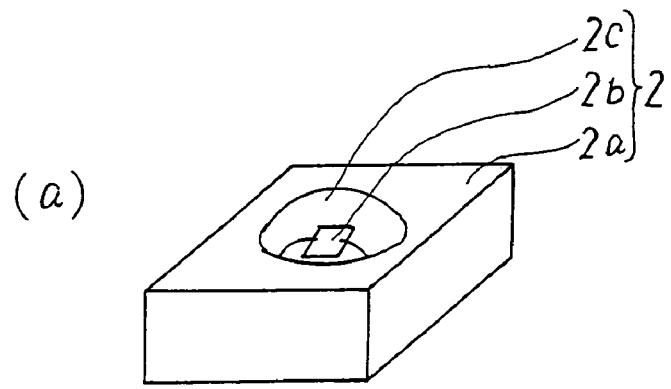
FIGS. 4(a) and 4(b) are perspective view and cross-sectional view showing a point light source used in the planar light source device according to the first embodiment of the present invention.
Figure 4:
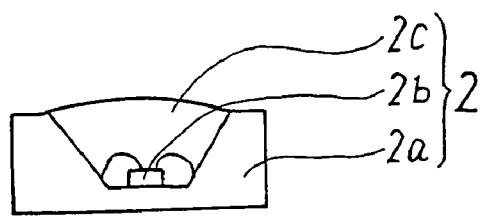

In this embodiment, each light guiding rod 1 is designed in a cylindrical shape, and the diameter L1 thereof is set to be equal to or larger than the diameter L2 of each point light source 2 so that light emitted from the point light source 2 is efficiently incident into the light guiding rod 1. Furthermore, each of light guiding rod 1 has a light emission means for varying a light emission rate in accordance with the distance from the point light source 2 is formed on the emission surface 1c (cylindrical surface) of each light guiding rod 1. In this first embodiment, the emission surface 1c is designed to have an uneven surface as the light emission means, and also the uneven surface is set to a gradation uneven surface (not shown) which is increased in roughness degree such as arithmetic average roughness, 10-point average depth or the like as the position is far away from the light source. That is, when the point light source 2 is disposed at one end face 1a of the light guiding rod 1 as in the case of this embodiment, the unevenness surface is designed so that the roughness is maximum at the emission surface 1c in the neighborhood of the other end face 1b at which no point light source 2 is disposed. Furthermore, the point light source 2 is a light emission diode (LED) serving as a semiconductor light emitting element having an outlook shown in FIG. 4(a) and a cross-sectional structure shown in FIG. 4(b), and it includes a semiconductor light emitting element 2b serving as a light emitting portion, sealing resin 2c, etc. which are arranged in a package 2a.

As shown in FIGS. 2 and 3, a reflection plate 6 for reflecting light emitted from the light source units 3 to the opening portion (light emission face) 21 is disposed below the plurality of light source units 3, that is, on the inner bottom surface of the second frame 8 in the metal housing including the first frame 7 and the second frame 8 to guide the light from the light source units 3 to the light emission surface 21 efficiently. The reflection plate 6 may be formed of a regular reflection plate deposited with metal such as aluminum, silver or the like, a white diffuse reflection plate or the like. From the viewpoint of uniformity of light, the diffuse reflection plate is preferably used. Furthermore, the regular reflection plate and the white diffuse reflection plate may be mixed.

Furthermore, a diffusion plate 4 for making uniform the light emitted from the light source units 3 and the light reflected from the reflection plate 6 is disposed at the opening portion (light emission face) 21 in the metal housing. The diffusion plate 4 is formed of a resin plate of acrylic resin, polycarbonate or the like which is contaminated with light scattering material, or a resin plate whose surface is made uneven. Furthermore, one or more optical sheets 5 each of which is a prism sheet, a diffusion sheet or the like for emitting light in a desired direction may be disposed above the diffusion plate 4. It is not necessarily required to dispose the optical sheet 5.

Next, the fixing means for fixing the light source units 3 to the metal housing will be described with reference to FIG. 5(a)(b).

Figure 5:
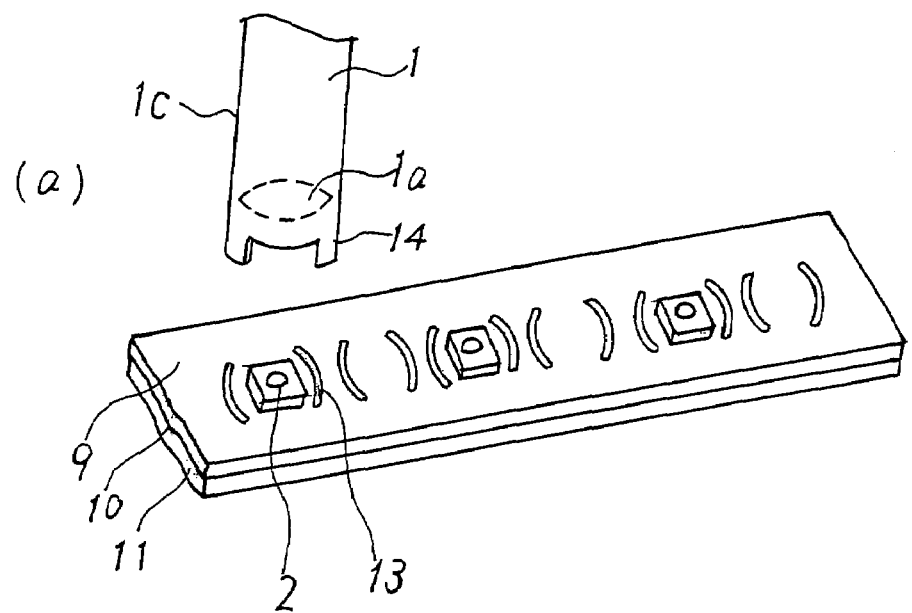
FIGS. 5(a) and 5(b) are exploded perspective view and perspective view showing a fixing unit of a light source unit in the planar light source device according to the first embodiment of the present invention.
Figure 5:
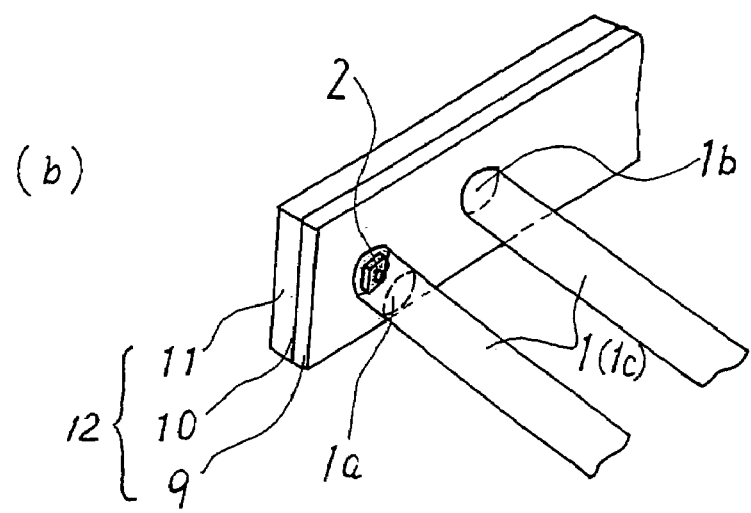

FIG. 5(a) is an exploded perspective view showing a part indicated by IV in FIG. 1, and FIG. 5(b) is a perspective view. As shown in FIG. 5(a), the plural point light sources 2 are mounted on a metal wire board 9 having a wire pattern (not shown), and driven through the wire pattern. Furthermore, a radiation plate 11 of metal or the like is disposed through an insulating member 10 at the back side of the wire board 9. The combination of the wire board 9, the insulating member 10 and the radiation plate 11 is referred to as a light source unit fixing portion 12.

The light emission characteristics (luminosity, chromaticity, etc.) of the light emitting diode (LED) used for each point light source 2 are varied in accordance with the ambient temperature. The LED has a tendency that the luminosity thereof is reduced when the ambient temperature is increased. Therefore, it is desirable that the ambient temperature is kept to a fixed low temperature in order to keep the brightness of the planar light source device 20 high and make the chromaticity constant. Therefore, according to this embodiment, the radiation plate 11 is disposed at the back side of the wire board 9 on which the point light sources 2 are mounted so that heat from the point light sources 2 is efficiently radiated to the outside.

With respect to a fixing means for fixing the end face 1a, 1b of each light guiding rod 1 to the light source unit fixing portion 12, as shown in FIG. 5(a), recess portions 13 are provided on the light source unit fixing portion 12, and projecting portions 14 each of which is provided in the neighborhood of the end face 1a (1b) of each light guiding rod 1 are provided so as to be engageable with the respective recess portions 13. The end faces 1a (1b) of the light guiding rods 1 can be fixed to the light source unit fixing portion 12 by engaging the projecting portions 14 with the recess portions 13. The fixing unit is not limited to the above structure, and hole portions penetrating through the light source unit fixing portion 12 may be provided in place of the recess portions 13, and other various fixing units may be applied. Furthermore, the light source unit fixing portion 12 is pinched and fixed between the first frame 7 and the second frame 8 as shown in FIG. 2, for example. At this time, a fixing manner is not limited to a specific one, and various fixing manners may be adopted. For example, the light source unit fixing portion 12 may be fixed to the first frame 7 or the second frame 8 by engaging screws or fixing pawls into the inner surface of the first frame 7 or second frame 8.

Next, the operation of the light source unit 3 according to this embodiment will be described with reference to FIGS. 6(a) and 6(b).

Figure 6:
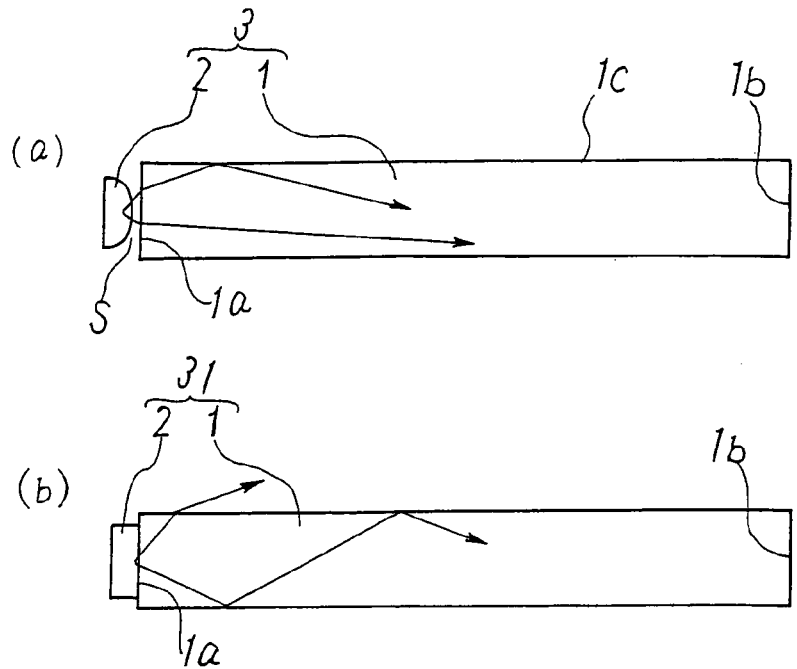
FIGS. 6(a) and 6(b) are diagrams showing the operation of light guiding rods used in the planar light source device according to the first embodiment of the present invention.

FIG. 6(a) shows the light source unit 3 of the first embodiment, and the point light source (LED) 2 is disposed so as to oppose to the end face 1a of the light guiding rod 1 through a spaces. FIG. 6(b) shows a light source unit 3b for comparison, and the light guiding rod 1 and the point light source 2 are arranged in close contact with each other. Light emitted from the point light source 2 is incident from the end face 1a into the light guiding rod 1. Here, in the light source unit 3 of this embodiment, the light incident on the light guiding rod 1 is refracted at the end face 1a as shown in FIG. 6(a), and the intersecting angle of the refracted light to the emission surface (cylindrical surface) 1c of the light guiding rod 1 is equal to the critical angle or more, so that the refracted light is totally reflected from the emission surface 1c and thus propagates toward the opposing other end face 1b in the light guiding rod 1. In the case of the light source unit 3b in which the point light source 2 and the light guiding rod 1 are arranged in close contact with each other as shown in FIG. 6(b), the difference between the refractivity of the sealing resin used for the point light source 2 and the refractivity of the material of the light guiding rod is smaller than the difference in refractivity between the material of the light guiding rod 1 and the air, and thus the refraction at the end face 1a is smaller as compared with the case of FIG. 6(a). Therefore, the intersecting angle between the light incident on the light guiding rod 1 and the emission surface 1c of the light guiding rod 1 is not more than the critical angle, and thus the refracted light is not totally reflected from the emission surface 1c of the light guiding rod 1, so that the amount of light emitted from the emission surface 1c to the outside in the neighborhood of the point light source 2 is increased.

Figure 7:
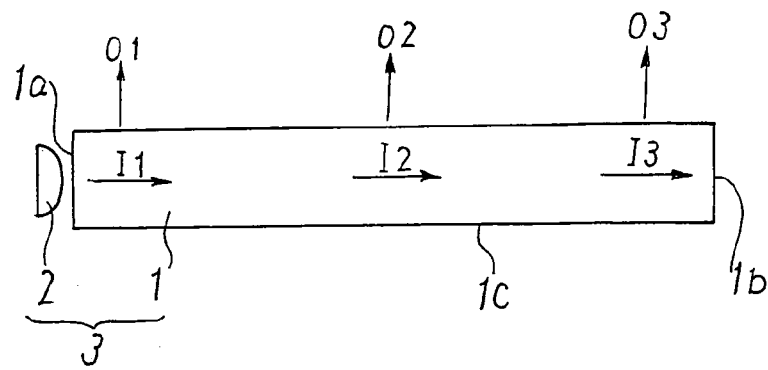
FIG. 7 is a diagram showing the operation of the light guiding rods used in the planar light source device according to the first embodiment of the present invention.

Next, the propagation process of light propagating in the light guiding rod 1 will be described with reference to FIG. 7. The light guiding rod 1 of this embodiment is designed so that the emission surface (cylindrical surface) 1c is made uneven as the light emission means. Therefore, the propagation direction of light propagating in the light guiding rod 1 is disturbed, and light whose propagation direction intersects the emission surface 1c at the critical angle or less is emitted from the emission surface 1c. Here, with respect to the overall light propagating in the light guiding rod 1 as shown in FIG. 7, the propagation light intensity of light in the neighborhood of the end face 1a at the point light source 2 side is represented by I1, the propagation light intensity of light in the neighborhood of the center portion is represented by I2 and the propagation light intensity of light in the neighborhood of the end face 1b at which no point light source 2 is disposed is represented by I3. Furthermore, with respect to the rate at which light is emitted from the emission surface 1c by the light emission unit provided to the light guiding rod 1 (hereinafter referred to as a light emission rate), the light emission rate in the neighborhood of the end face 1a at the point light source 2 side is represented by t1, the light emission rate in the neighborhood of the center portion is represented by t2 and the light emission rate in the neighborhood of the end face 1b is represented by t3. With respect to light emitted from the emission surface 1c of the light guiding rod 1, the emitted light intensity in the neighborhood of the end face 1a at the point light source 2 side is represented by O1, the emitted light intensity in the neighborhood of the center portion is represented by O2 and the emitted light intensity in the neighborhood of the end face 1b is represented by O3. In this case, the following equation is satisfied at each point.

$$On = tn \times In (n=1, 2, 3) \quad (1)$$

Here, light is gradually emitted from the light guiding rod 1, and thus the propagation light intensity at each point satisfies the following relationship: I1>I2>I3. Accordingly, when the light emission rate at each point satisfies t1=t2=t3, the emission light intensity of the light emitted from the light guiding rod 1 has such a distribution that it is strong in the neighborhood of the end face 1a at the point light source 2, and weakened as the position is far away from the end face 1a (O1>O2>O3). However, in this embodiment, the roughness of the emission surface 1c is adjusted so that the light emission rate satisfies t1<t2<t3, and thus emitted light having little unevenness in brightness can be achieved from each light source unit.

The light emitted from the emission surface 1c of the light guiding rod 1 reaches the diffusion plate 4 directly or through the reflection plate 6, and then emitted from the diffusion plate 4. The light emitted from the diffusion plate 4 is provided with desired directivity by an optical sheet 5, and then irradiated to the liquid crystal panel to display an image of the liquid crystal panel.

As described above, the first embodiment is provided the plurality of light source units 3. Each of light source units 3 includes the light guiding rod 1 and the point light source 2. The light guiding rods 1 of the light source units 3 are arranged in parallel to one another in the metal housing. The point light source 2 of each of the light source units 3 is disposed so as to oppose to the one end face 1a of the light guiding rods 1 through space and emits light to the one end face 1a. By this structure, it does not have any fluorescent tube used in the conventional just-below type planar light source device. Therefore, no leak current occurs between each light source unit 3 and the metal housing (the second frame 8). Therefore, the distance between the light source unit 3 and the second frame 8 (the distance indicated by a character a of FIG. 3) can be reduced, and a thin type planar light source device 20 can be achieved. Since no fluorescent tube is used, a planar light source device 20 containing no mercury serving as environmental load material is achieved. Furthermore, the light guiding rods 1 constituting the light source units 3 are smaller in volume than the light guiding plate used in the conventional edge light type planar light source device, and thus the planar light source device 20 having more light weight can be achieved.

Furthermore, in the first embodiment, the uneven surface whose roughness is varied in accordance with the distance from the point light source is provided on the emission surface 1c of the light guiding rod 1, and thus the planar light source device 20 having little unevenness in brightness can be achieved. Furthermore, in the first embodiment, the light guiding rod 1 is designed in a cylindrical shape. Therefore, light is emitted from the light guiding rod 1 in every direction, so that spreading of light in the planar light source device 20 is large, and light emitted from the respective light source units 3 can be sufficiently mixed. Therefore, the unevenness in brightness and the unevenness in color (color heterogeneity) can be suppressed even when the distance to the diffusion plate 4 at the light emission face 21 side (the distance indicated by a character b of FIG. 3) is not large, and the planar light source device 20 can be designed to be further thin. Furthermore, the point light sources are arranged in the housing so as to be alternately located in proximity to one end faces and the other end faces of the plural light guiding rods 1 (that is, the point light sources are disposed in a wobbled arrangement with respect to the end faces of the plural light guiding rods 1), whereby the unevenness in brightness can be suppressed. Furthermore, as compared with an arrangement in which the point light sources 2 are arranged only one end face side of the light guiding rods, the interval between the point light sources 2 can be increased, and temperature increase can be reduced. Accordingly, according to the first embodiment, a planar light source device 20 and a liquid crystal display device which are thin and light weight and have high display quality can be achieved.

Figure 8:
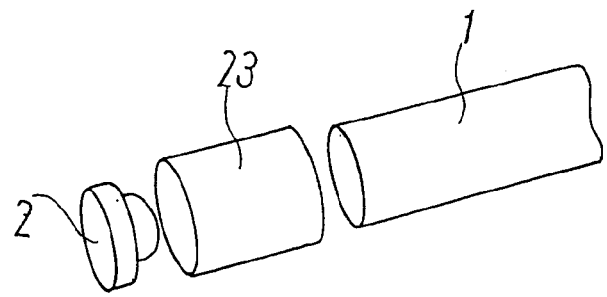
FIG. 8 is an exploded perspective view showing another construction of the light source unit used in the planar light source device according to the first embodiment of the present invention.

In the first embodiment, the uneven surface whose roughness is varied in accordance with the distance from the point light sources 2 is provided on the emission surface 1c of the light guiding rod 1, however, the light emission means is not limited to the uneven surface. For example, a surface means for varying the light emission rate in accordance with the distance from the point light source 2 may be provided to at least a part of the light guiding rod 1. For example, a prism array in which prisms are regularly arranged may be used on the light emission surface 1c, and the brightness distribution in the longitudinal direction of the light guiding rod 1 may be adjusted by varying the height or angle of the prism array. Furthermore, white print in which density or dot diameter is varied may be used on the emission surface 1c. The light emission rate of the light emission surface may be adjusted in accordance with the position so that a desired brightness distribution such as a brightness distribution in which the brightness is higher in the vicinity of the center of the light guiding rod 1 is achieved. Still furthermore, two point light sources 2 may be disposed so as to oppose to both the end faces of each light guiding rod 1, thereby constituting the light source unit 3. A reflection plate guide 23 which is designed in a ring shape as shown in FIG. 8 and has a high reflectivity characteristic at least at the inner surface thereof may be provided in order to efficiently guide emitted light from the point light source 2 to the light guiding rod 1, and further the reflection plate guide 23 may be fixed or integrated with the light source unit fixing portion 12, whereby it is used as the light source unit fixing unit.

Second Embodiment

Figure 9:
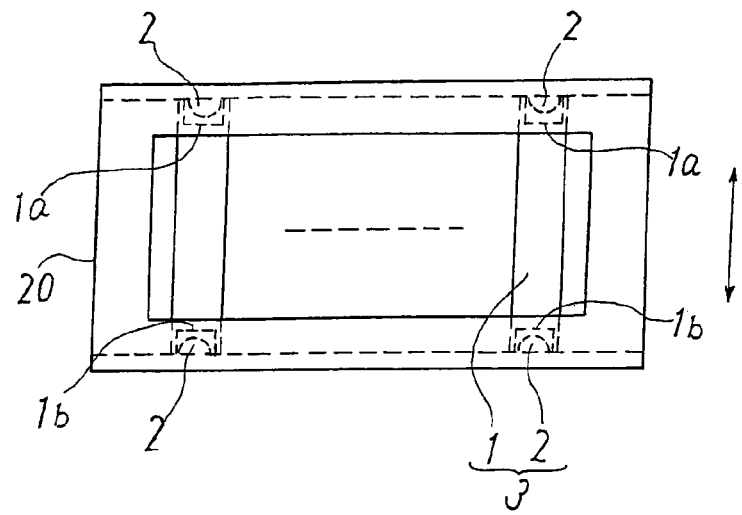
FIG. 9 is a plan view showing a planar light source device according to a second embodiment of the present invention.

FIG. 9 is a plan view showing a planar light source device according to a second embodiment of the present invention. As shown in FIG. 9, the planar light source device 20 according to the second embodiment is designed so that plural light source units 3 achieved by arranging point light sources 2 at both the end faces 1a, 1b of respective light guide rods 1 is disposed in the vertical direction (the direction indicated by an arrow in FIG. 9), that is, in parallel to the short side of the substantially rectangular opening portion (light emission face 21) having long sides and short sides. In FIG. 9, the same elements as or corresponding parts to those of the first embodiment are represented by the same reference numerals, and the description thereof is omitted.

Figure 10:
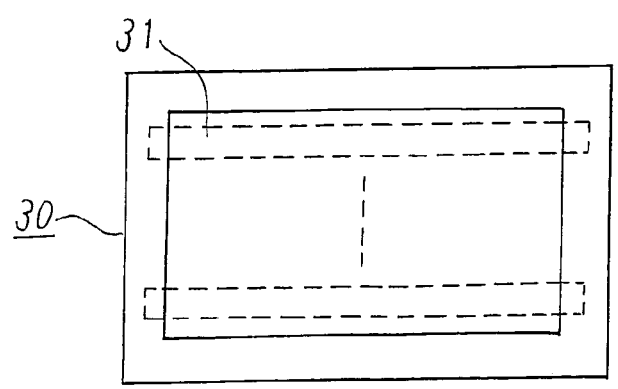
FIG. 10 is a plan view showing a conventional planar light source device.

Recently, large-size display devices such as 30-inch wide type, 40-inchi wide type, etc. have been strongly required. In the case of such a large-size liquid crystal display device, when the linear light sources (fluorescent tubes) 31 are arranged in the horizontal direction (the direction parallel to the long side direction of the opening portion) as in the case of the conventional planar light source device 30 shown in FIG. 10, there occurs such a problem that the length of the linear light sources 31 is very long, the light intensity is insufficient, it is difficult to handle the device, it is necessary to enhance the inverter performance, etc. However, when the conventional linear light sources 31 are arranged in the vertical direction, there is a tendency that mercury is deviated to the electrodes at the lower side, so that there may occur such a problem that the linear light sources cannot be normally turned on, the lifetime is extremely shortened, etc. Therefore, it is impossible to arrange the linear light sources in the vertical direction. On the other hand, each of the light source units 3 of the planar light source 20 according to the second embodiment is constructed by the light guiding rod 1 and the point light sources 2, and thus even when they are arranged in the vertical direction, the above problem does not occur. Therefore, this embodiment provides the vertical arrangement of the light source units which is preferable in light intensity, handling, etc.

As described above, according to the second embodiment, the light source units 3 each of which includes the light guiding rod 1 and two point light sources 2 are arranged in the vertical direction (the direction parallel to the short side of the opening portion 21), thereby achieving the planar light source device 20 which is excellent in light intensity, handling, etc. Furthermore, as in the case of the first embodiment, the second embodiment provides the planar light source device 20 and the display device which are designed to be thin in thickness and light in weight and have no unevenness in brightness.

Third Embodiment

Figure 11:
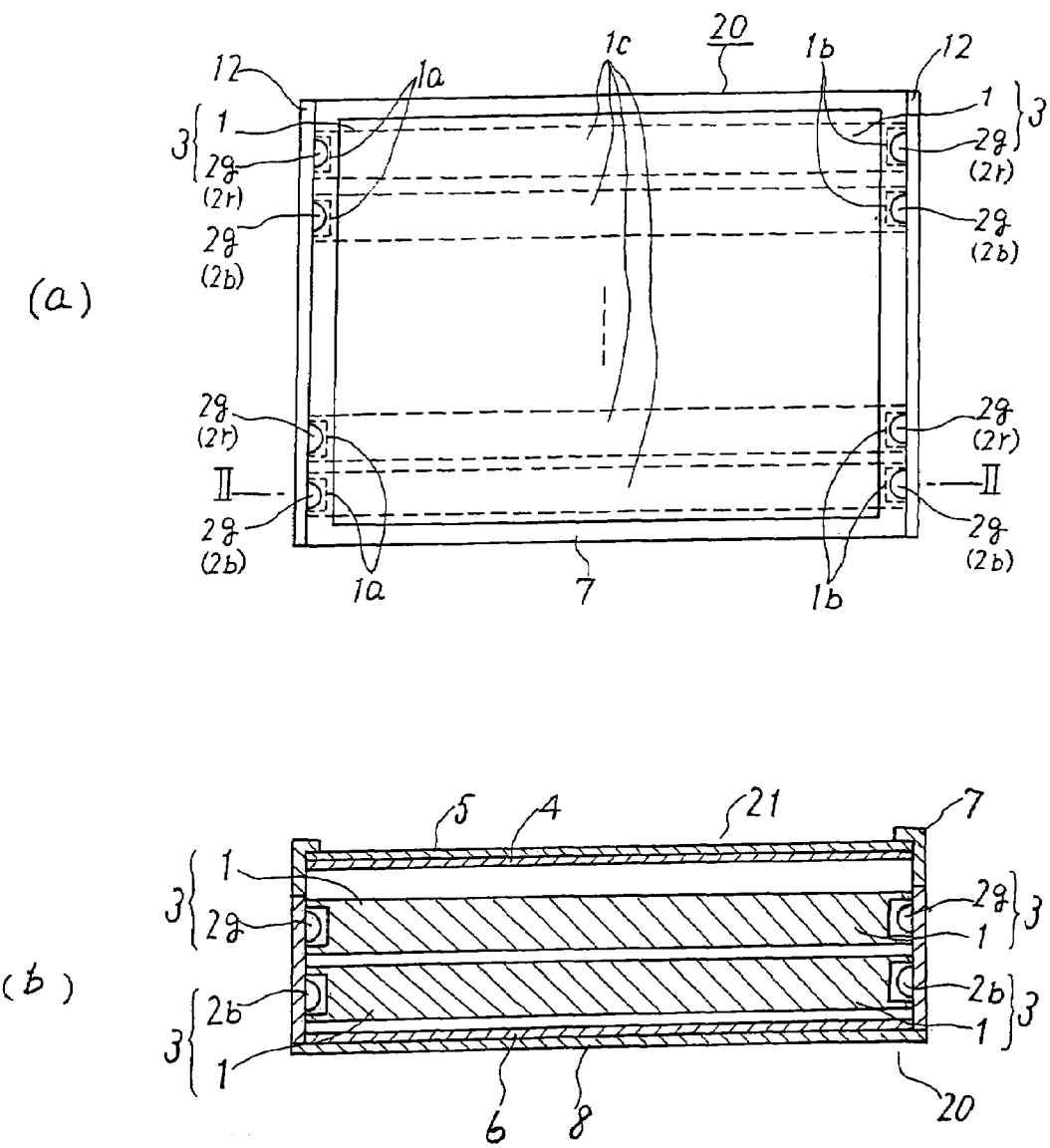
FIGS. 11(a) and 11(b) are plan view and horizontally sectional view showing a planar light source device and a light guiding rod according to a third embodiment of the present invention.

FIG. 11(a) is a plan view showing a planar light source device 20 according to a third embodiment of the present invention, and FIG. 11(b) is a horizontally sectional view showing a part indicated by II-II of FIG. 11(a). In FIGS. 11(a) and 11(b), the same elements as or corresponding to the elements of the first and second embodiments are represented by the same reference numerals, and the duplicative description thereof is omitted.

In the planar light source device 20 of the third embodiment, a red point light source 2r, a green point light source 2g and a blue point light source 2b are used in light source units 3. The numbers of the light source units 3 of the respective colors (red, green and blue) are different among the colors, and in order to achieve a desired color, the numbers of the red and blue light source units are respectively set to 4 while the number of the green light source units is set to 8. Furthermore, as shown in FIG. 11(b), the red and blue light source units 3 are arranged at the reflection plate 6 side, and the green light source units 3 are arranged at the diffusion plate 4 side (characters of (2r), (2b), etc. in FIG. 11(b) represent the point light sources of the light source units 3 arranged at the reflection plate 6 side (that is, at the lower stage). Therefore, a larger number of light source units 3 can be arranged in the limited metal housing, and the planar light source device 20 and the display device which are bright can be achieved. In addition, the color light source units whose number is smaller can be arranged so that the propagation distance till the diffusion plate 4 can be achieved, so that the unevenness in brightness and the unevenness in color can be suppressed.

Figure 12:
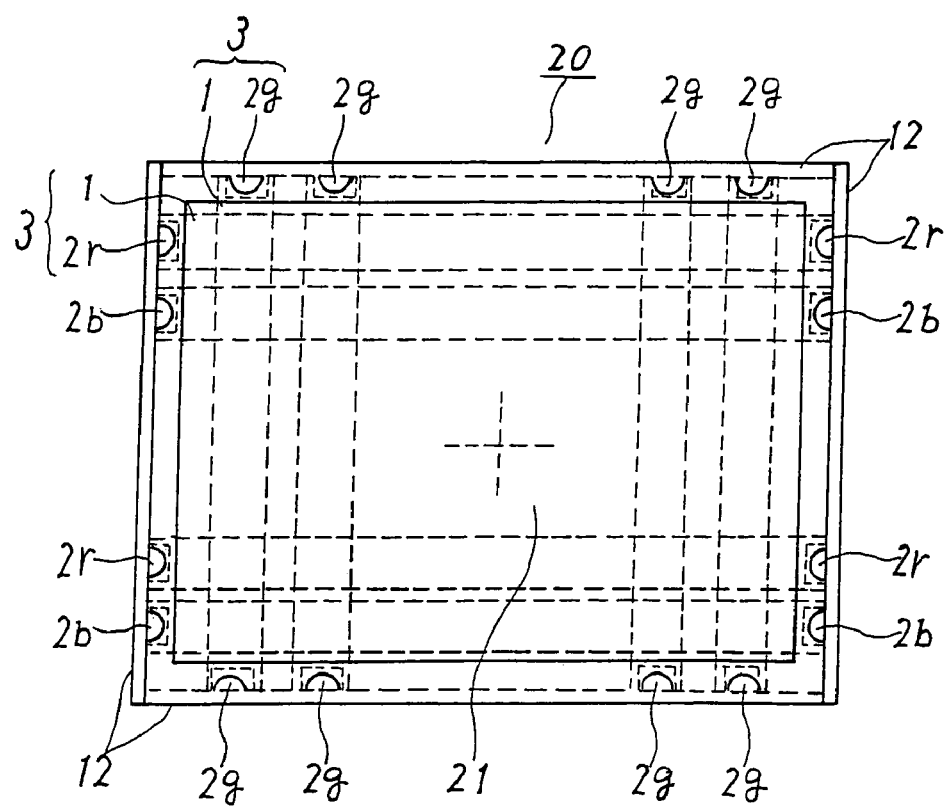
FIG. 12 is a plan view showing another construction of the planar light source device according to the third embodiment of the present invention.

In the third embodiment, the point light sources 2r, 2g and 2b which are different in emitted light color are used for the light source units 3. However, it is needless to say that the point light sources having the same emitted light color may be used. In this case, the planar light source device 20 and the display device which are bright and have little unevenness in brightness can be also achieved. Furthermore, in the third embodiment, the light source units 3 are arranged in parallel to one another so that the light source units 3 at the upper and lower stages are overlapped with one another. However, the light source units at the upper and lower stages may be arranged so as to be displaced from one another. Furthermore, the arrangement direction may be varied between the light source units 3 at the upper and lower stages as shown in the plan view of FIG. 12. In FIG. 12, the green light source units 3 at the upper stage are arranged in parallel to the short side of the substantially rectangular opening portion (light emission face 21), and the red or blue light source units 3 at the lower stage are arranged in parallel to the long side of the opening portion 21. In this case, the planar light source device 20 and the display device which have little unevenness and have high display quality can be also achieved.

Fourth Embodiment

Figure 13:
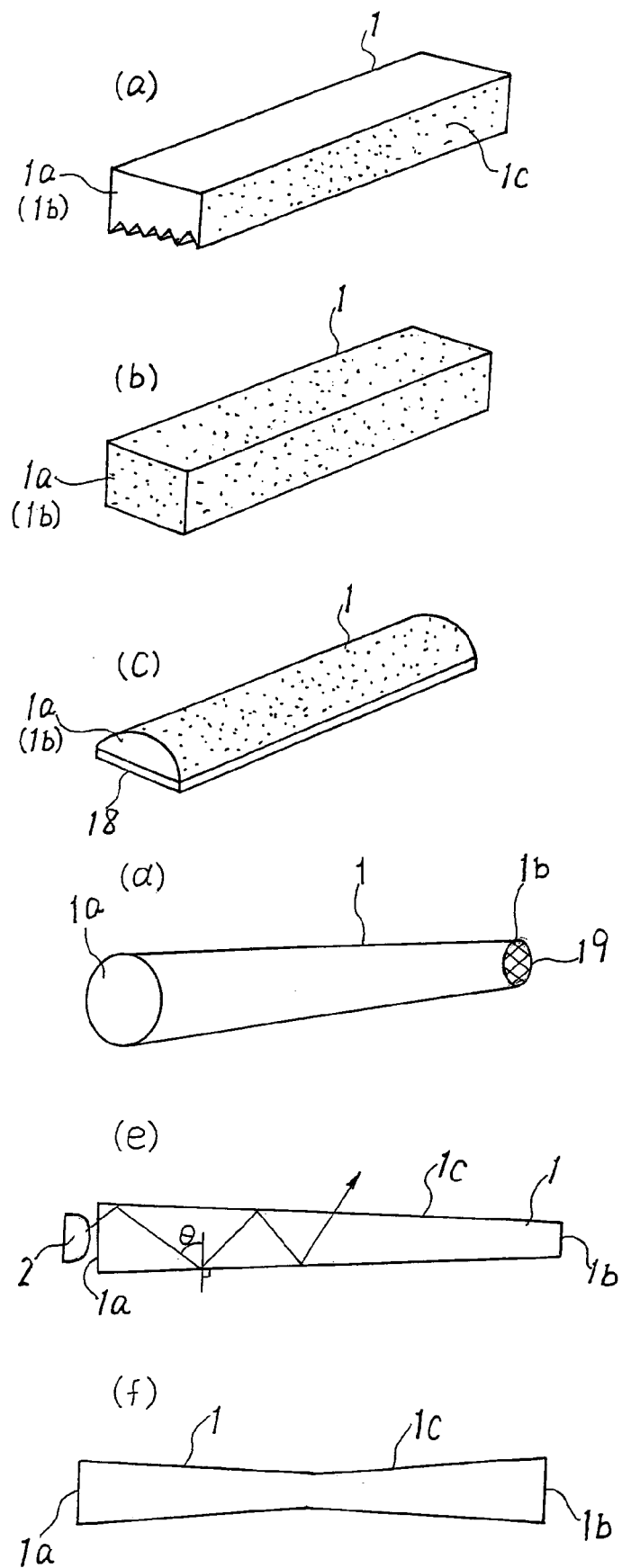
FIGS. 13(a) to 13(f) are perspective views and cross-sectional views showing various light guiding rods and light source units used in a planar light source device according to a fourth embodiment of the present invention.
Figure 14:
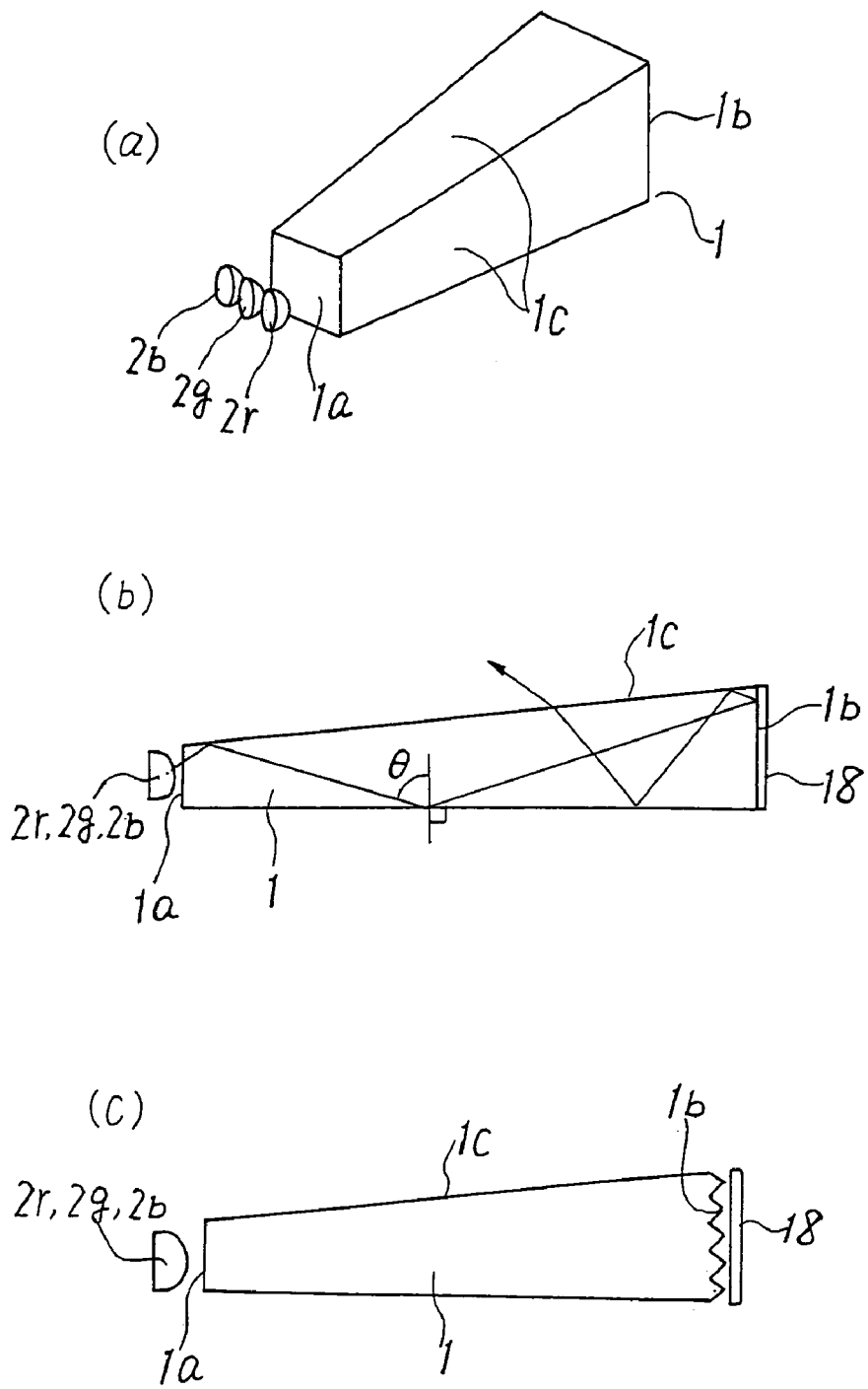
FIGS. 14(a) to 14(c) are a perspective view and cross-sectional views showing various light guiding rods and light source units used in the planar light source device according to the fourth embodiment of the present invention.
Figure 15:
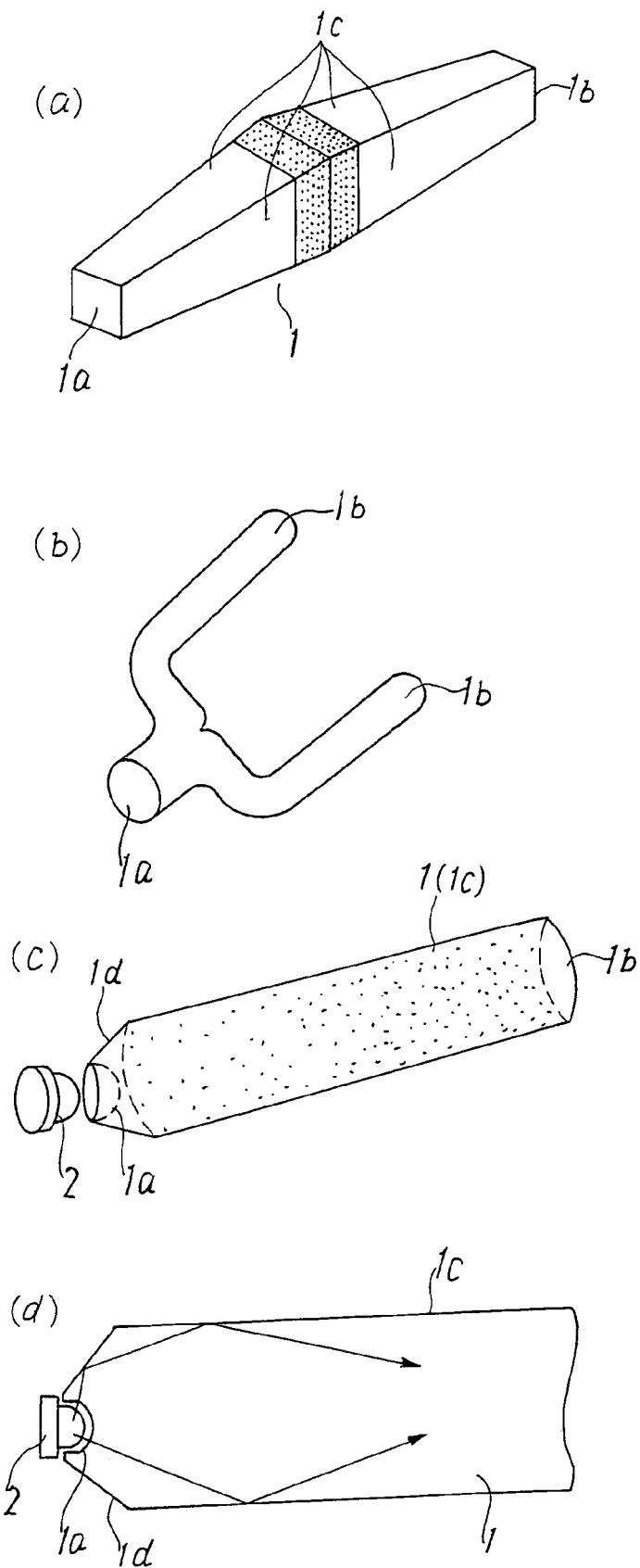
FIGS. 15(a) to 15(d) are perspective views and cross-sectional views showing various light guiding rods and light source units used in the planar light source device according to the fourth embodiment of the present invention.

In the fourth embodiment, various examples of the light guiding rods 1 constituting the light source units 3 used in the planar light source device 20 according to the present invention will be described with reference to FIGS. 13, 14 and 15. FIGS. 13(a) to 13(f) FIGS. 14(a) to 14(c) and FIGS. 15(a) to 15(d) are perspective views and cross-sectional views showing light guiding rods 1 or light source units 3 used in the planar light source device 20 of the fourth embodiment. In the figures, the same elements as or corresponding elements to those of the first to third embodiments are represented by the same reference numerals, and the duplicative description thereof is omitted. Furthermore, in FIGS. 13, 14 and 15, the upper side corresponds to the light emission face 21 side, the lower side corresponds to the reflection plate 6 side.

The light guiding rod 1 shown in FIG. 13(a) has a substantially rectangular cross section, and the side surfaces of the emission surface 1c which are vertical to the light emission face 21 are subjected to gradation and set to uneven surfaces as the light emitting means so that the emitted light intensity from the emission surface is substantially fixed in the longitudinal direction of the light guiding rod. Furthermore, the bellow side surface of the emission surface 1c which is located at the reflection plate 6 side is designed as a prism array whose ridge lines extend in the longitudinal direction of the light guiding rod 1 as the light emitting means. By forming the prism array, light which is totally reflected from the prism array reaches the uneven surfaces at a high rate, and thus the light can be emitted efficiently.

The surfaces which are set to the uneven surface or the prism face are not limited to the above embodiment, and other surfaces constituting the emission face 1c of the light guiding rod 1 may be set to uneven surfaces or prism faces, and the prism faces and the uneven surfaces may be set to the same surfaces by making the surfaces of the prism faces uneven. In order to emit light from the light guiding rod 1 in every direction, it is preferable that the diffusion-processed surface is provided to the maximum number of surfaces constituting the light guiding rod 1 except for the end face 1a (1b) on which light from the point light source is incident Furthermore, the light emitting means is not limited to the uneven surface and the prism face. For example, white-dot print or the like may be used, and the direction of the ridge lines of the prisms may be inclined or vertical to the longitudinal direction of the light guiding rod 1. The light emitting means is not limited to a specific one, and any means may be used insofar as it can efficiently disturb propagation of light in the light guiding rod 1 and take out light from the emission surface.

The light guiding rod 1 shown in FIG. 13(b) is designed so that the end face 1a (1b) opposing to each point light source 2 is also subjected to the unevenness surface processing to form the uneven surface on the end face 1a (1b). By forming the uneven surface on the end face 1a (1b) serving as the light incident face as described above, strong light in the neighborhood of the point light source 2 can be diffused, and the unevenness in brightness in the neighborhood of the point light source 2 of the light guiding rod 1 can be suppressed.

The light guiding rod 1 shown in FIG. 13(c) has a substantially semi-sphere cross section, and the upper side surface thereof at the light emission surface is set to an uneven surface. The bellow side surface thereof at the reflection plate side is subjected to a reflex action treatment, so that light incident from the end face 1a (1b) is more efficiently emitted from the light emission face side. The reflex action treatment is implemented by attaching a reflection sheet 18, depositing reflection film or carrying out two-color molding using white resin at the reflection surface side and transparent resin at the light emission face side or the like. Therefore, the light incident from the end face 1a (1b) can be more efficiently emitted from the light emission face side.

The light guiding rod 1 shown in FIG. 13(d) is designed so that the point light source 2 is disposed so as to oppose to the end face 1a at one side, and the area of the end face 1a at which the point light source 2 is disposed is set to be larger than the area of the other end face 1b. With this construction, the intersecting angle θ between the normal line of the emission surface 1c and light emitted from the point light source 2 and propagating in the light guiding rod 1 is reduced as the light propagates as shown in FIG. 13(e). When the intersecting angle θ is reduced to the critical angle or less, the light can emit from the emission surface 1c, and the light emitting means can be easily provided to the light guiding rod 1. Furthermore, since the light guiding rod 1 is designed in a taped shape, a larger number of light source units 3 can be arranged in the housing by arranging the light source units 3 so that the positions of the end faces 1a at which the point light sources 2 are located are located alternately between both the sides of the housing, and thus a bright planar light source device can be achieved.

Furthermore, the light guiding rod 1 is designed so that the area of the cross section at the center portion is smaller than the area of the cross section at each of both the end faces 1a, 1b of the light guiding 1 as shown in FIG. 13(f), and the point light sources 2 are arranged so as to oppose to the end faces 1a and 1b at both the sides, whereby a larger number of point light sources 2 can be arranged and the bright planar light source device 20 can be achieved. A part of the emission surface 1c of the light guiding rod 1 may be provided with a light emitting means such as uneven portions, prisms, white print or the like so that the distribution of an emission light intensity of the light guiding rod 1 becomes any distribution.

Furthermore, the light guide rod 1 shown in FIG. 14(a) has a substantially rectangular cross section, and plural point light sources 2r, 2g, 2b different in emitted light color are disposed so as to oppose to the end face 1a at one side of the light guiding rod 1 through a space. The area of the end face 1a at which the point light sources 2r, 2g, 2b are arranged is set to be smaller than the area of the other end face 1b. With this construction, the intersecting angle θ between the normal line of the emission surface 1c and light which is emitted from the point light source 2r, 2g, 2b and propagates from the end face 1a to the end face 1b in the light guiding rod 1 is increased as the light propagates as shown in FIG. 14(b). Therefore, the intersecting angle θ is not reduced to the critical angle or less, and the light reaches the end face 1b without emitting from the emission surface 1c. Furthermore, the intersecting angle θ between the normal line of the emission face 1c and light reflected from the end face 1b serving as the reflection face to the end face 1a is reduced as the light propagates. Accordingly, the critical angle θ is reduced to the critical angle or less, and thus the light is emitted from the emission surface 1c. As described above, by designing the light guiding rod 1 in the shape shown in FIG. 14(a), the light propagates in the light guiding rod 1 by a fixed distance and then emits from the light guiding rod 1. Therefore, light beams emitted from the plural point light sources 2r, 2g, 2b different in emitted light color are mixed with one another in one light guiding rod 1, and the mixed light can be taken out as light having little unevenness in color from the emission surface 1c.

It is preferable that the reflection face of the end face 1b is made a diffused reflection surface by attaching a white reflection sheet 18 to the end face 1b or setting the end face 1b as an uneven surface or prism face and then depositing the end face 1b with reflection film of silver, aluminum or the like. In place of making the end face 1b a reflection face, a reflection sheet 18 may be provided so as to oppose to the end face 1b as shown in FIG. 14 (c). In this case, it is also preferable that the optical path of the reflection light is disturbed by using a white reflection sheet or making the end face 1b as an uneven surface or prism face.

The light guiding rod 1 shown in FIG. 15(a) has a substantially rectangular cross section, and the area of the cross section vertical to the longitudinal direction is varied. Plural point light sources 2r, 2g, 2b different in emitted light color are arranged so as to confront the end face 1a at one side of the light guiding rod 1 through a space, the area of the cross section at the center portion is larger than the area of both the end faces 1a, 1b of the light guiding rod 1, and a light emitting means is provided in the neighborhood of the center of the emission face 1c of the light guiding rod 1. Light emitted from the point light source 2 propagates in the light guiding rod 1 while totally reflected until it reaches the light emitting means provided in the neighborhood of the center of the light guiding rod 1. However, the propagation direction of the light is disturbed by the light emitting means. Furthermore, as the light continues to propagate in the direction along which the area of the cross-section is reduced, the intersecting angle of the light to the normal line of the emission face 1c is reduced, and finally reduced to the critical angle or less, so that the light is emitted from the emission face 1c. As described above, by designing the light guiding rod 1 in the shape shown in FIG. 15(a), the light propagates in the light guiding rod 1 by a fixed distance and then is emitted therefrom. Therefore, light beams emitted from the plural point light sources 2r, 2g, 2b different in emitted light color are mixed with one another in one light guiding rod 1, and it can be taken out as light having little unevenness in color Furthermore, the point light sources 2r, 2g, 2b can be arranged so as to confront both the end faces 1a, 1b of the light guiding rod 1, so that the bright planar light source 20 can be achieved.

The light guiding rod 1 shown in FIG. 15(b) is shaped so as to branch light incident from one end face 1a into two light beams. Therefore, even when the number of point light sources 2 used in the planar light source device 20 is small, a larger area can be achieved as the area of the light guiding rod 1 from which light is emitted, and a planar light source device 20 which has little unevenness in brightness and unevenness in color can be achieved. The number of branches may be set to two or more.

The light guiding rod 1 shown in FIG. 15(c) is designed so that the end face 1a on which light is incident form the point light source 2 is designed to be curved, and a reflection area 1d for reflecting light incident on the light guiding rod 1 to the opposing end face 1b side is provided in the neighborhood of the end face 1a. Light incident from the end face 1a to the light guiding rod 1 is reflected from the reflection area 1d as shown in FIG. 15(d), and propagates to the end face 1b. In this propagation process, the light from the light guiding rod 1 is emitted in any brightness distribution by the light emitting means provided to the emission face 1c of the light guiding rod 1. The total reflection may be utilized by designing the reflection area 1d in a tapered shape in the neighborhood of the end face 1a as shown in FIG. 15(c), or by coating reflection film or covering or attaching a reflection sheet in the neighborhood of the end face 1a. The point light source 2 may be arranged so as to confront both the end faces 1a, 1b of the light guiding rod 1 while the reflection area is provided in the neighborhood of each of the end faces 1a, 1b.

The display unit used in the first to fourth embodiments is not limited to the liquid crystal panel, and it may be any display unit which is disposed above the light emission face 21 of the planar light source device 20 and modulates light emitted from the planar light source device 20 to display information, for example, a unit comprising a plate having a light transmissible function on which figures are drawn. Furthermore, the point light source 2 is not limited to LED shown in FIG. 4, and for example, plural or plural kinds of semiconductor light emitting elements may be arranged in one package, and further LDs may be used.

The present invention is applicable to a display device using the planar light source device, particularly a liquid crystal display device, and it can be used for a display device of a computer, or a display device such as a monitor, a television set or the like.

What is claimed is:

1. A planar light source device comprising:
   a housing having an opening portion in an upper surface thereof;
   a plurality of light source units, each including a light guiding rod arranged in the housing and at least one point light source disposed so as to oppose at least one end face of the light guiding rod and emit light to the one end face; and
   a reflection plate disposed below the plurality of light source units in the housing and reflects light emitted from the light source units to the opening portion,
   wherein each of the light guiding rods has a light emission means for varying a light emission rate in accordance with a distance from the point light source to one end face thereof, the light emission means being an uneven surface whose roughness is varied in accordance with the distance.

2. The planar light source device according to claim 1, wherein at least one of the point light sources is disposed so as to oppose to at least one end face of the light guiding rod through a space.

3. The planar light source device according to claim 1, wherein the plurality of light source units include a plural kinds of the light source units using different kinds of the point light sources that emits different light colors.

4. The planar light source device according to claim 1, wherein the opening portion of the housing is designed in a substantially rectangular shape having long sides and short sides, and the light guiding rods of all light source units are arranged in substantially parallel to the short sides of the opening portion.

5. A display device comprising the planar light source device according to claim 1, and a display unit which is disposed above the opening portion of the planar light source device and modulates light emitted from the planar light source device to display information.

6. A planar light source device comprising:
   a housing having an opening portion in an upper surface thereof;
   a plurality of light source units, each including a light guiding rod arranged in the housing and at least one point light source disposed so as to oppose to at least one end face of the light guiding rod and emit light to the one end face; and
   a reflection plate which is disposed below the plurality of light source units in the housing and reflects light emitted from the light source units to the opening portion,
   wherein each of the light guiding rods is designed so that the sectional area thereof in the vertical direction to the longitudinal direction thereof is varied.

7. The planar light source device according to claim 6, wherein at least one of the point light sources is disposed so as to oppose to at least one end face of the light guiding rod through a space.

8. The planar light source device according to claim 6, wherein the plurality of light source units include a plural kinds of the light source units using different kinds of the point light sources that emits different light colors.

9. The planar light source device according to claim 6, wherein the opening portion of the housing is designed in a substantially rectangular shape having long sides and short sides, and the light guiding rods of all light source units are arranged in substantially parallel to the short sides of the opening portion.

10. A display device comprising the planar light source device according to claim 6, and a display unit which is disposed above the opening portion of the planar light source device and modulates light emitted from the planar light source device to display information.

11. A planar light source device comprising:
- a housing having an opening portion in an upper surface thereof;
- a plurality of light source units, each including a light guiding rod arranged in the housing and at least one point light source disposed so as to oppose at least one end face of the light guiding rod and emit light to the one end face; and
- a reflection plate which is disposed below the plurality of light source units in the housing and reflects light emitted from the light source units to the opening portion,
- wherein each of the light guiding rods has a light emission means for varying a light emission rate in accordance with a distance from the point light source to the end face thereof, the light emission means is a prism array whose brightness distribution in a longitudinal direction of the light guiding rod is adjusted in accordance with the distance.

12. The planar light source device according to claim 11, wherein at least one of the point light sources is disposed so as to oppose at least one end face of the light guiding rod through a space.

13. The planar light source device according to claim 11, wherein the plurality of light source units include a plural kind of the light source units using different kinds of the point light sources that emits different light colors.

14. The planar light source device according to claim 11, wherein the opening portion of the housing is designed in a substantially rectangular shape having long sides and short sides, and the light guiding rods of all light source units are arranged in substantially parallel to the short sides of the opening portion.

15. A display device comprising the planar light source device according to claim 11, wherein a display unit is disposed above the opening portion of the planar light source device and modulates light emitted from the planar light source device to display information.

* * * * *